No. 683,847. Patented Oct. 1, 1901.
E. CATENACCI & R. & C. PETRINI.
REVOLVING HOOK MACHINE.
(Application filed July 31, 1899.)
(No Model.) 7 Sheets—Sheet 1.

No. 683,847. Patented Oct. 1, 1901.
E. CATENACCI & R. & C. PETRINI.
REVOLVING HOOK MACHINE.
(Application filed July 31, 1899.)
(No Model.) 7 Sheets—Sheet 2.
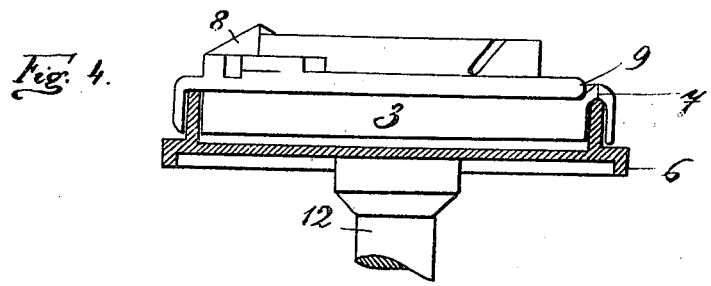
Fig. 4.
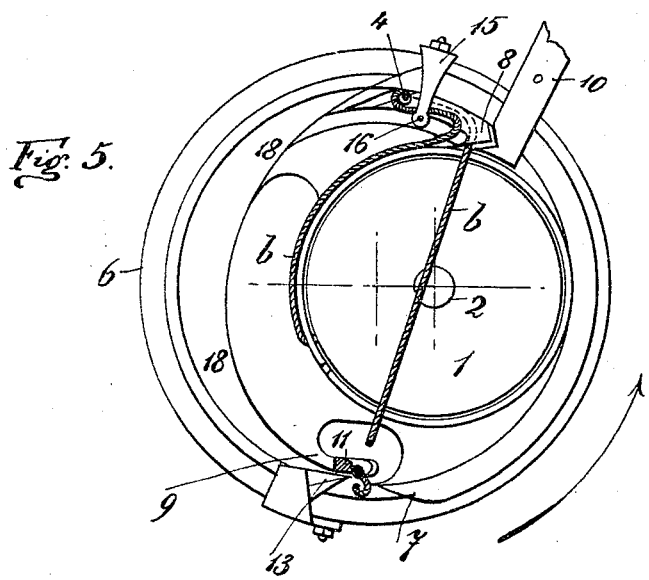
Fig. 5.
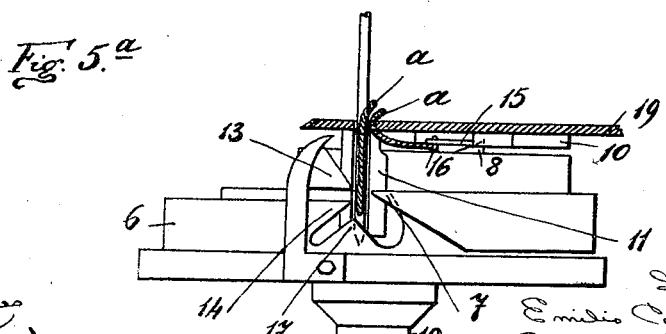
Fig. 5.ᵃ
Witnesses
Inventors
Emilio Catenacci
Corradino Petrini
Ruggero Petrini
by James L. Norris
atty.

No. 683,847. Patented Oct. 1, 1901.
E. CATENACCI & R. & C. PETRINI.
REVOLVING HOOK MACHINE.
(Application filed July 31, 1899.)
(No Model.) 7 Sheets—Sheet 3.
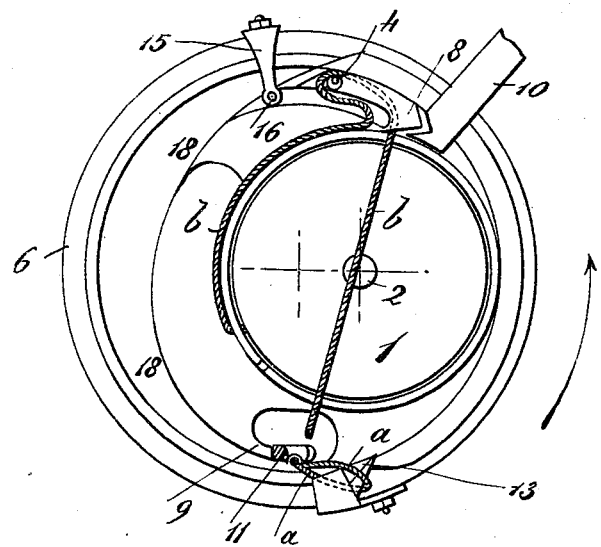
Fig. 6.
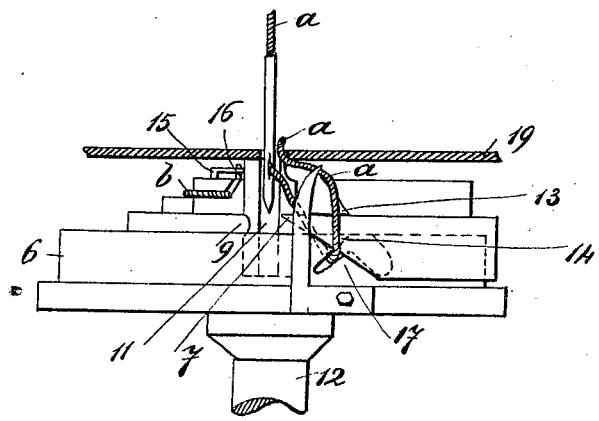
Fig. 6.ª
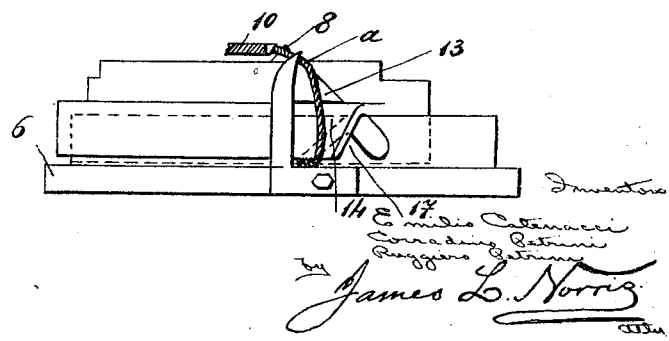
Fig. 7.ª

No. 683,847. Patented Oct. 1, 1901.
E. CATENACCI & R. & C. PETRINI.
REVOLVING HOOK MACHINE.
(Application filed July 31, 1899.)
(No Model.) 7 Sheets—Sheet 4.

No. 683,847. Patented Oct. 1, 1901.
E. CATENACCI & R. & C. PETRINI.
REVOLVING HOOK MACHINE.
(Application filed July 31, 1899.)
(No Model.) 7 Sheets—Sheet 5.
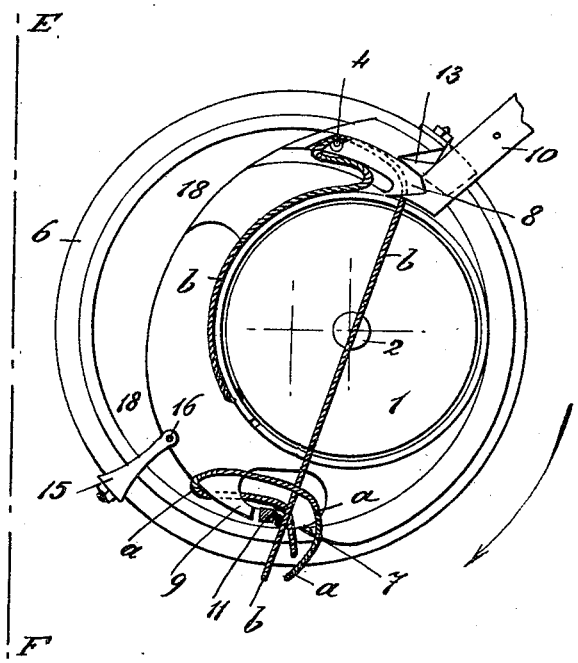
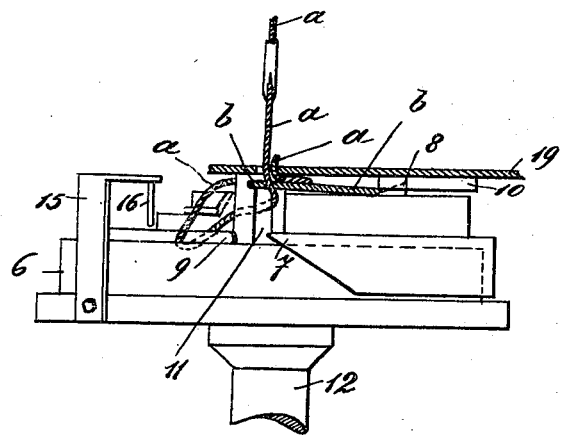

No. 683,847.
Patented Oct. 1, 1901.
E. CATENACCI & R. & C. PETRINI.
REVOLVING HOOK MACHINE.
(Application filed July 31, 1899.)
(No Model.)
7 Sheets—Sheet 6.
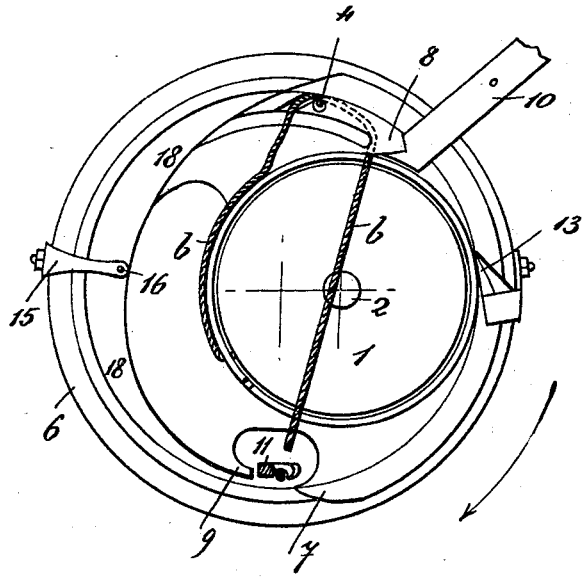
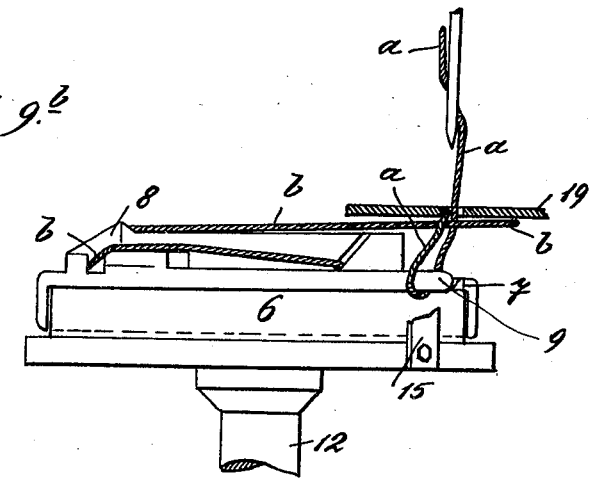

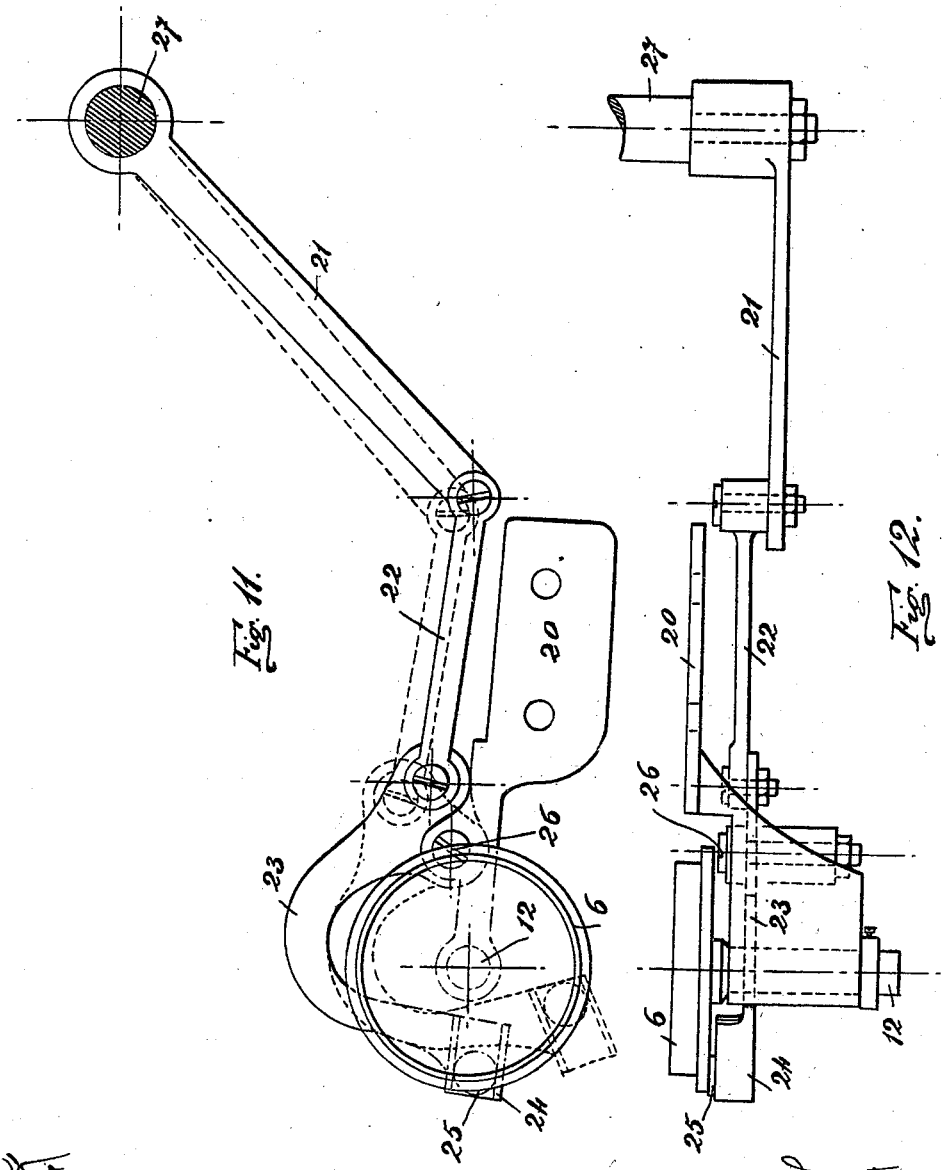

UNITED STATES PATENT OFFICE.

EMILIO CATENACCI, OF MILAN, AND RUGGIERO PETRINI AND CORRADINO PETRINI, OF CHIETI, ITALY.

REVOLVING-HOOK MACHINE.

SPECIFICATION forming part of Letters Patent No. 683,847, dated October 1, 1901.

Application filed July 31, 1899. Serial No. 725,670. (No model.)

*To all whom it may concern:*

Be it known that we, EMILIO CATENACCI, merchant, residing at 12 Via Meravigl, Milan, and RUGGIERO PETRINI, engineer, and COR-RADINO PETRINI, machinist, residing at Chieti, in the Kingdom of Italy, subjects of the King of Italy, have invented certain new and useful Improvements in Revolving-Hook Machines, of which the following is a specification.
This invention relates to that type of sewing-machines employing a rotary hook and a thread-case having an oscillatory motion, its object being more especially the employment of a much larger spool or bobbin for carrying the thread than has heretofore been possible without endangering the exactitude and uniformity of the stitch.

Figure 2:
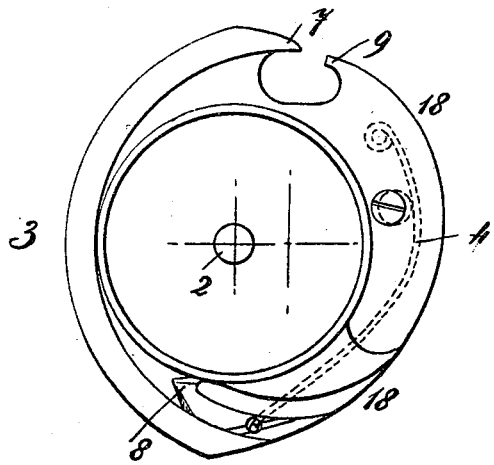
Figure 1:
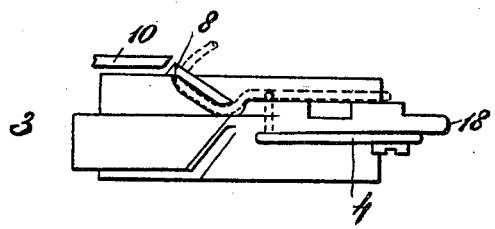
Figure 3:
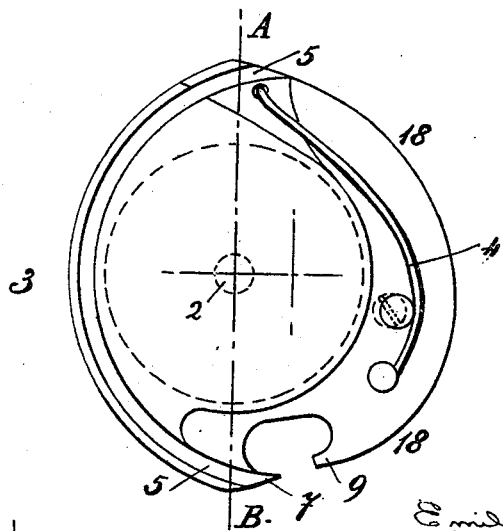
Figure 7:
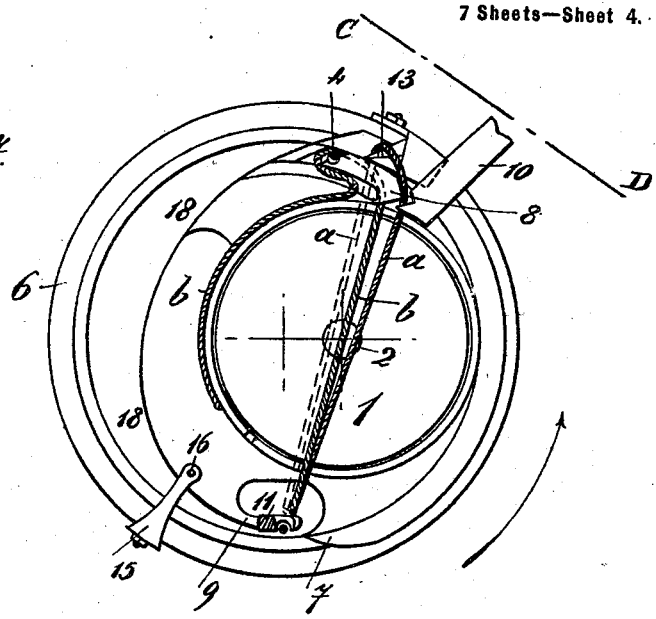
Figure 8:
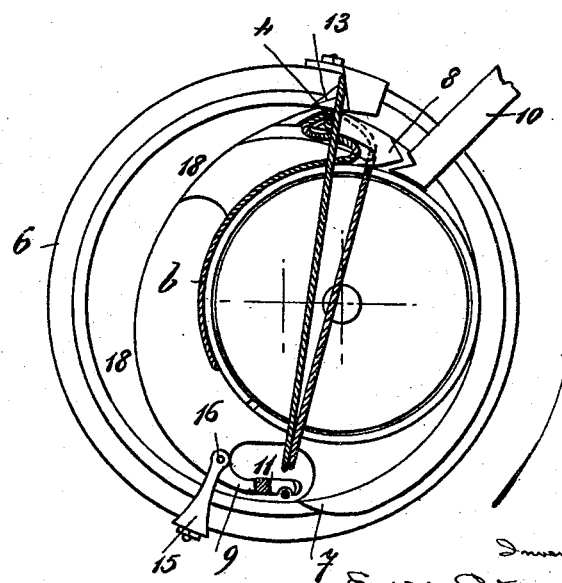

The invention is illustrated in the accompanying drawings, wherein—
Figure 1 is a side elevation of the thread-case. Figs. 2 and 3 are a top and an inverted plan view thereof, respectively. Fig. 4 is a view, partly in side view or elevation and partly in section, showing the thread-case and hook assembled, said section being taken on the line A B of Fig. 3. Figs. 5 and $5^a$ are a plan and a side elevation of the same parts, disclosing the needle-thread loop about to receive the hook loop-forming devices. Figs. 6 and $6^a$ are similar views of the same parts, showing the loop-forming devices of the hook as having placed the needle-thread loop upon the beak of the thread-case. Figs. 7 and $7^a$ are a plan and a side view or elevation of the same parts, respectively, the latter being taken in the plane C D of the former, showing the needle-thread loop as having been carried across the thread-case in a plane passing through the bottom and top thereof and the thread as having arrived and retained at a point between the parts 8 and 10. Fig. 8 is a plan view of said parts, showing the thread-case in the extreme position of its stroke and the needle-thread loop as having passed the part 8 and about to be carried along the crescent-shaped guide 18 18 of the thread-case at the instant the needle-thread-loop-forming devices begin their return movement. Figs. 9, $9^a$, and $9^b$ are a plan and side elevation of said parts, respectively, the last view being taken on the plane E F, disclosing the needle-thread loop as having arrived upon the return stroke or movement of the hook, with the loop-forming devices at the instant of the loop leaving the thread-case, said loop slipping between the parts 9 11 and carrying or taking with it the bobbin-thread. Fig. 10 is a plan view thereof with the parts shown as having reached a point in their return stroke or movement when the stitch has been formed. Figs. 11 and 12 are a plan and an elevation of a suitable actuating mechanism for imparting an oscillatory movement to the hook.

The spool or bobbin 1, which is mounted on the center pin 2 of the thread-case 3, has no other special feature than that of being of very large dimensions. The thread-case 3, provided with a tension-spring 4 for retaining the bottom thread in the desired position before, during, and after the operation of looping of the needle-thread, is formed with a circular groove 5, by means of which it is freely supported on the hook. (See Fig. 4.) The thread-case is formed with a beak 7, which aids in the formation of the loop, with a side projection 8, and a blunt claw 9. The side projection 8 is designed to strike against a stop 10, fixed to the under side of the table 19 of the machine. The claw 9 comes into contact with the needle-guide 11. From this it results that the thread-case 3 is not carried along by the hook and is only permitted to accomplish an oscillation of few millimeters, so as to afford passage to the thread.

The hook 6 receives an oscillatory circular motion around its stationary axis 12 by any known means.

A convenient arrangement for providing an oscillatory movement to the hook 6 is shown by way of example in Figs. 11 and 12, this being actuating mechanism arranged below the table of the machine.

27 is the driving-shaft, performing an oscillatory motion and continuing in an upward direction.

20 is a plate fixed to the under side of the table and serving in supporting the oscillatory shaft 12 of the hook 6.

21 is a rocking lever keyed to the shaft 27.

22 is a short link which transmits the oscillating motion of the shaft 27 to the crank 23, which is of a special form, and pivoting around the fixed stud 26 and terminating in a slide-head 24, engaging the stud 25, provided on the lower face of the hook 6. This, however, does not form an essential part of the invention, which only consists in the special arrangement of the parts hereinafter described.

The hook is provided with two loop-forming devices, an upper one 13 and a lower one 14. This latter is located in the prolongation of the cylindrical surface which serves to support the shuttle by entering the groove 5, and thus can be covered by this groove. The pointed portion 17 serves for protecting the needle. (See Fig. 5ᵃ.)

The hook 6 is integral with the arm 15, which is furnished with a pin 16, having for its object to slacken the bobbin-thread before the stitch is formed and to render the stitches thoroughly uniform and regular by obviating the stress due to the resistance of the spool or bobbin against rotation, such resistance varying naturally according to the diameter of the uppermost layer of thread on the spool and which has been the reason of their being limited to such small diameters. The manner of forming the loop will be understood from Figs. 5 to 10, in which the direction of rotation of the hook is indicated by an arrow in each figure at the moment when the parts are in the position represented in the figure.

The needle-thread is designated by the letters $a\ a$, and the bobbin-thread by $b\ b$.

In the plan and elevation shown in Figs. 5 and 5ᵃ the loop of the thread $a$ is ready to receive the loop-forming devices 13 and 14, which are now approaching, while in the meantime the pin 16 has released the thread $b$, which has been drawn off the bobbin 1, inserted in the thread-case. Referring to Figs. 6 and 6ᵃ, it will be seen that the hook having continued its rotary motion the loop-forming devices 13 and 14 have placed the loop of the needle-thread $a$ upon the beak 7 and by continuing to pull it downward causes this thread to pass around the thread-case, the bobbin-thread remaining slack during the whole time by means of the spring 4. According to Figs. 7 and 7ᵃ the hook has continued its rotary motion in the same direction, thereby causing the loop $a\ a$ of the needle-thread to engage around the thread-case, both over the top and under the bottom, the upper portion of such loop on arriving in the position Fig. 7 being retained in the space between 8 and 10 by the projection 8. Referring to Fig. 8, it will be noted that the thread-case carrier is in the extreme position of its throw in the direction of the arrow. Owing to the action of the ordinary tension the loop $a\ a$ of the needle-thread has passed over the projection 8 and is on the point of sliding, through the influence of the needle, along the crescent-shaped side 18 18 of the thread-case as soon as the loopers begin their return motion. In Figs. 9, 9ᵃ, and 9ᵇ is shown the position taken by the loop of the needle-thread due to the rearward return motion of the hook and loopers at the moment when said loop leaves the bobbin-case by slipping through the space between the claw 9 and needle-guide 11 and taking with it the bobbin-thread. In Fig. 10 it will be observed that the return motion has continued and that the stitch has been formed by using the bobbin-thread previously slackened off without necessitating the rotation of the bobbin. The bobbin upon which the thread is wound is not rotated when the thread-tightener descends, because the amount of thread required for the formation of the stitch has been previously drawn out by the action of the pin 6 of the arm 15, as previously described, and the thread retained in such position by the spring 4.

What we claim is—

1. In a sewing-machine of the character described, the combination with a machine-table, of a stop thereon, a needle-guide, a thread-case provided with a lateral projection adapted to engage said stop, a beak and claw carried by the thread-case and arranged diametrically opposite to the lateral projection, said claw engaging the needle-guide, a hook provided with an elongation engaging the thread-case, upper and lower loop-forming devices carried by the hook and engaging the needle-thread, and a pin connected with the hook and adapted to slacken the bobbin-thread.

2. In a sewing-machine of the character described, the combination of a needle-guide, a thread-case having a lateral projection for effecting the retention of the needle-thread at a predetermined interval, a beak and claw carried by the thread-case and arranged at a diametrically opposite side of the case to said lateral projection, said claw adapted to engage the needle-guide, a hook, upper and lower loop-forming devices carried thereby and having oppositely-inclined edges providing opposite tapering terminals, and a bobbin-thread-slackening device carried by the said hook.

3. In a sewing-machine of the character described, the combination with a machine-table, of a stop thereon, a needle-guide, a thread-case having a lateral projection engaging the said stop and effecting the retention of the needle-thread at a predetermined point or interval, a beak and claw carried by the thread-case, said claw adapted to engage the needle-guide, a rotary hook, upper and lower loop-forming devices carried by said hook and having inclined edges providing opposite tapered terminals, and a bobbin-thread-slackening device carried by said hook and comprising an overhanging arm having a pendent pin for engaging the bobbin-thread.

4. In a sewing-machine of the character described, a needle-guide, a thread-case having a circular groove in its under side, a hook adapted to engage said groove, means to arrest the movement of said thread-case, means to effect the engagement of said thread-case with the needle-guide, means to engage said thread-case with the needle-thread loop, means carried by said hook and adapted to form the needle-thread loop, and means to cause said hook to slacken the bobbin-thread, substantially as set forth.

5. In a sewing-machine of the character described, the combination with a machine-table, of a stop thereon, a needle-guide, a thread-case having a circular groove in its under side, a lateral projection adapted to engage said stop and to effect the retention of the needle-thread at a predetermined interval or the formation of the loop, a beak and claw arranged at the diametrically opposite side of the thread-case to said lateral projection, said claw adapted to engage the needle-guide, a hook engaging with the groove of said thread-case, upper and lower loop-forming devices carried by the hook and having oppositely-inclined edges with opposite tapered terminals, and a bobbin-thread-slackening device carried by the hook and arranged in suitable relation to said loop-forming devices.

In testimony whereof I have hereunto set my hand, in presence of two subscribing witnesses, this 14th day of July, 1899.

EMILIO CATENACCI.

Witnesses:
VIRGINIS CARNEVALJ,
MICHELE DE DRAY.

In testimony whereof we have hereunto set our hands, in presence of two subscribing witnesses, this 13th day of July, 1899.

RUGGIERO PETRINI.
CORRADINO PETRINI.

Witnesses:
CORLI FELICE,
STURBINI VINCENYO.